Nov. 10, 1931.     A. J. MICHELIN     1,831,186
WEIGHING APPARATUS
Filed Aug. 6, 1930     3 Sheets-Sheet 1
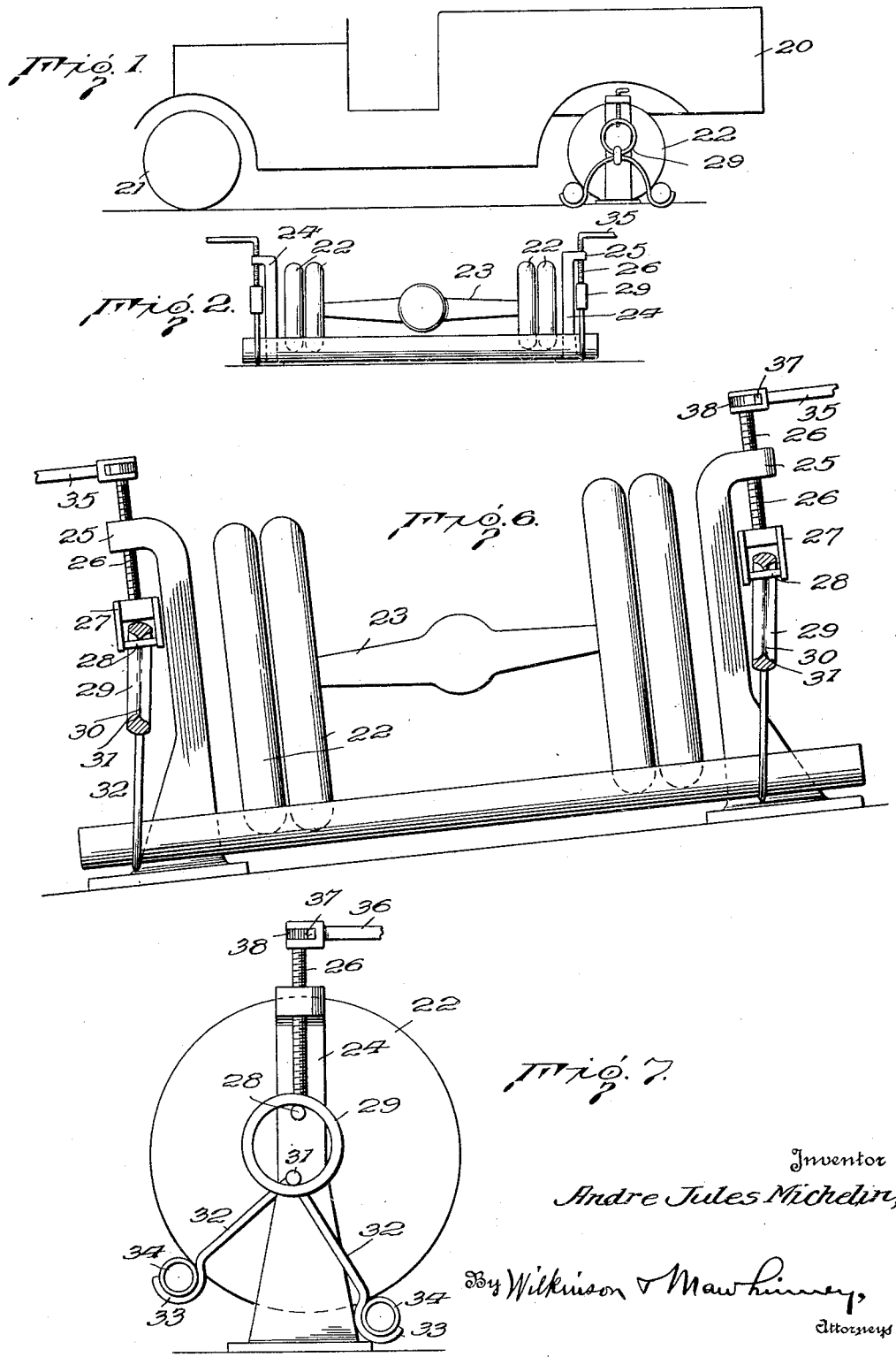

Nov. 10, 1931.  A. J. MICHELIN  1,831,186
WEIGHING APPARATUS
Filed Aug. 6, 1930  3 Sheets-Sheet 2
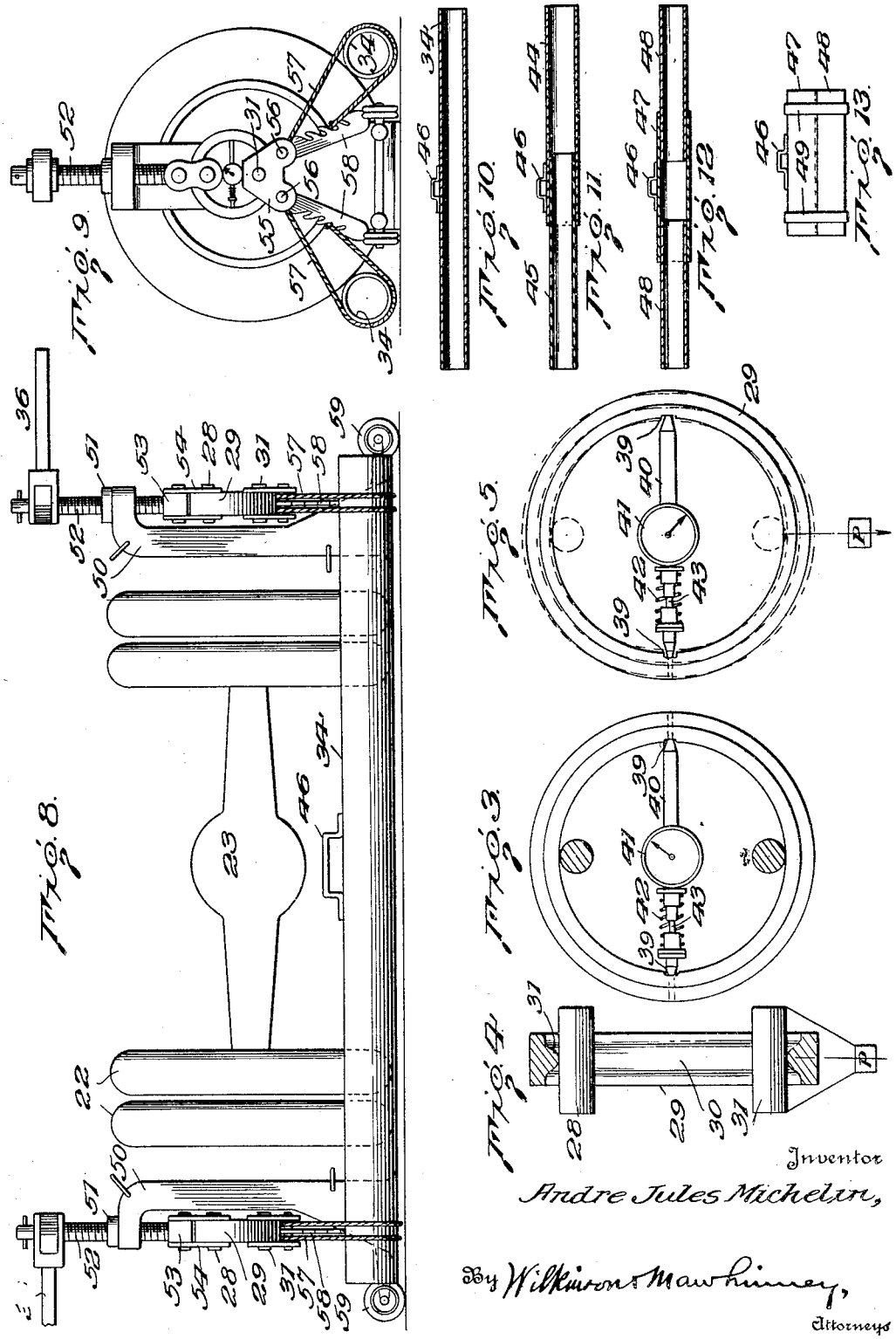
Inventor
Andre Jules Michelin,
By Wilkinson & Mawhinney,
Attorneys Nov. 10, 1931.  A. J. MICHELIN  1,831,186
WEIGHING APPARATUS
Filed Aug. 6, 1930    3 Sheets-Sheet 3
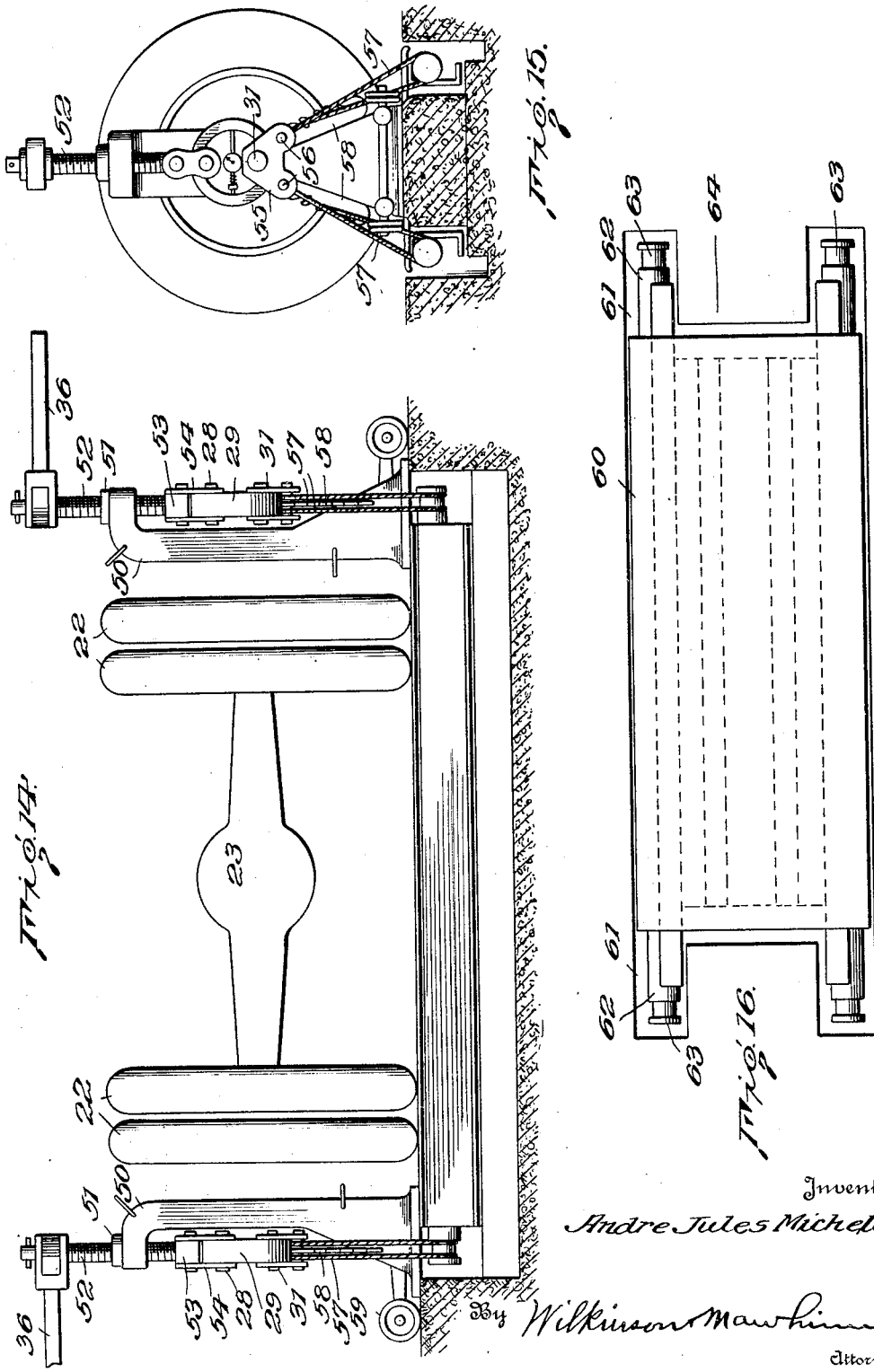
Inventor
Andre Jules Michelin,
By Wilkinson Mawhinney
Attorneys Patented Nov. 10, 1931

1,831,186

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

WEIGHING APPARATUS

Application filed August 6, 1930, Serial No. 473,427, and in France August 12, 1929.

The present invention relates to weighing apparatus and more particularly to an apparatus for application to vehicles for determining the weight supported by the axles thereof.

An object of the present invention is to provide a weighing apparatus which may be quickly and easily applied to a vehicle to determine the weight upon the axles thereof and which admits of a construction whereby the weighing apparatus may be portable, may be erected upon ground either level or at an inclination, and a weighing device which may be quickly and easily set up about the wheels of the vehicle so as to raise the same and determine the weight imposed thereon.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation showing, somewhat diagrammatically, the application of a weighing device constructed according to the present invention, as applied to the rear wheels of a motor vehicle.

Figure 2 is a rear elevation of the same with the body of the vehicle removed.

Figure 3 is a detail view partly in section of the dynamometric ring and its adjacent parts employed, and in normal position before taking up the load.

Figure 4 is a vertical section taken through the same with parts removed.

Figure 5 is a view similar to Figure 3, but showing the ring deformed in the position under stress of the load.

Figure 6 is an enlarged rear elevation of an axle with wheels having the weighing device of the invention applied thereto, and as disposed upon an inclined support.

Figure 7 is an end elevation of the same showing the parts adjusted in a position assumed prior to taking up the load.

Figure 8 is a rear elevation of the axle of a vehicle with its wheels, as applied to a slightly modified form of the invention.

Figure 9 is an end elevation of the same.

Figure 10 is a detail longitudinal section taken through one of the supporting bars employed.

Figure 11 is a like view of a slightly modified form of the same, and wherein the bar may be collapsed.

Figure 12 is a like view showing a further modification of the collapsible bar.

Figure 13 is a side elevation of the collapsible bar of Figure 12 in folded or nested form for transportation.

Figure 14 is a rear elevation of the axle with its wheels and showing applied thereto a further slightly modified form of the invention.

Figure 15 is an end elevation of the same, and

Figure 16 is a top plan view of the modified form of support for the wheels.

Referring to the drawings, and first to Figure 1, 20 designates the body of a vehicle provided with front wheels 21 and rear wheels 22, the latter being mounted on the opposite ends of an axle 23, as shown in Figures 2 and 6.

The invention embodies a pair of standards 24 adapted to be arranged one at each end of the axle 23 and beyond the wheels 22 thereof. Each standard 24 is provided with an outwardly offset nut portion 25 through which is threaded a jack screw 26, the lower end of which is provided with a yoke 27 which may be in the form of a block swivelled on the lower end of the screw 26 and having depending arms between which are mounted a cross pin 28 adapted to engage through a deformable ring 29, the latter comprising a dynamometric ring of predetermined size and resistance to deformation. As best shown in Figures 3, 4, 5 and 6, the inner wall of the ring is provided with an inwardly projecting centrally disposed bead or edge 30 adapted to rest upon the cross pin 28 and admitting of the free swinging or rocking of the ring laterally for assuming a substantially horizontal position under all conditions of use. The pin 28, therefore, lies in the upper part of the ring 29 and naturally seeks the uppermost portion of the ring.

Arranged across the ring and disposed in its lowermost portion is a lower cross pin 31 which is connected to a pair of diverging hooks 32 having arms of sufficient length to dispose the bills 33 of the hooks beyond the peripheries of the wheels 22.

The bills 33 of the hooks preferably open in opposite directions and are of sufficient size and shape to engage beneath and support a pair of cross bars 34 which engage against the lower portions of the wheels 22 and extend entirely across the vehicle, so that the wheels 22 at opposite sides of the vehicle are supported upon the opposite end portions of the bars 34. The hooks 33 diverge to an extent considerably less than the diameter of the wheels 22, so that the bars 34 are maintained against appreciable spreading when placed under tension, and so that the bars 34 are elevated by the hooks 32. The bars will bear at spaced points against the lower portions of the wheels 22, and thus support the same. The hooks 32, with the rings 29, are raised with respect to the standards 24 by turning up the jack screws 26. The jack screws 26 may be provided with handles 35 upon their upper ends, which are of any suitable construction, and the handles may be merely the turned over upper ends of the jack screws or may, as shown in Figures 6 and 7 particularly, comprise hand levers 36 mounted for rotation upon the upper ends of the jack screws 26 and provided with pawls 37 interlocking with ratchet wheels 38 secured to the upper ends of the jack screws 26 for intermittently turning the latter upon the reciprocation of the hand levers 36.

When a jack screw 26 is raised, it lifts the pin 28, and the latter in turn raises the upper portion of the ring 29. The ring 29 in turn raises the lower pin 31, and the ring 29 is deformed proportionately to the weight raised, as indicated in dotted lines in Figure 5, so that the distance between the pins 28 and 31 increases while the distance between the intermediate side portions of the ring 29 decreases. Advantage is taken of this deformation of the ring 29 to ascertain the weight by scales or tables, such as the scales or tables compiled by Bareme. The ring 29 is provided in opposite sides with apertures 30, in which are seated the opposite ends of a cross rod 40, which carries at an intermediate point a micrometer 41 or other suitable indicator. The opposite side of the cross rod 40 has interposed in it a spring 42, or other suitable resilient connection of predetermined resistance, and which embodies a sliding pin 43 connected to the micrometer 41 for actuating the latter upon the shortening of the rod 40 incident to the contraction, laterally, of the ring 29. The reading upon the indicator 41 may be compared to the scales in any suitable manner for determining the weight which is imposed upon the ring 29 in elevating the wheels 22.

It will be observed from Figure 6 that incident to the bead 31 within the ring 29, the weight will be suspended substantially vertically through the ring 29, so that the latter may freely act in a natural manner for taking up and recording the weight.

As shown in Figure 10, each cross bar 34 may comprise a single hollow tube of suitable thickness and material to impart the desired strength to the bar, and the bar may be of suitable length to extend entirely across the rear axle with its ends sufficiently beyond the same for engagement with the suspension means of the weighing device.

In Figure 11, the cross bar is shown as comprising two parts 44 and 45 which telescope one into the other, and the outer part may be provided with a suitable handle 46 for facilitating transportation, and adjustment of the bar.

In Figure 12, the bar is disclosed in a further modified form, wherein a central tubular section 47 removably and telescopicably supports in its opposite ends the end sections 48. The central section 47 carries the handle 46 and, as shown in Figure 13, the end sections 48 may be withdrawn from the central section 47 and placed against the lower side thereof, and the sections 47 and 48 may be secured removably in nested or packed position by bands or strips 49 which encircle the folded sections.

In the modified form shown in Figures 8 and 9, the weighing device is provided with a pair of standards 50 having nut portions 51 offset outwardly from their upper ends and through which jack screws 52 are threaded, the jack screws being operated by the levers 36 in the manner above described. The lower ends of the jack screws 52 carry swivelled blocks 53, to which are hinged links 54 carrying at their lower ends the cross pin 28.

The cross pin 28 engages through the ring 29, as above set forth, and the ring in turn carries the lower pin 31 in the manner heretofore described. The pin 31 is connected at its outer ends to a pair of bracket plates 55 which are of substantially triangular form and diverged downwardly and carry pins 56 in their lower corners, to which are attached the upper ends of suspension cables 57 adapted to engage about the cross bars 34. The other ends of the cables 57 are carried upwardly about the bars 34 and are suitably engaged in upwardly directed rack teeth carried upon a pair of downwardly extending rack bars 58 also mounted on the pins 56 at their upper ends. In this manner, the loops of the cables 57 may be adjusted to accommodate the same to conditions met with. The standards 50 are preferably provided with rollers 59, or the like, mounted in any suitable manner on the lower ends of the standards to facilitate adjustment and shifting of the standards during the setting up of the weighing device.

Referring now to the modification which is disclosed in Figures 14, 15 and 16, it will be noted that the construction is similar to that shown in Figures 8 and 9, with the exception that the cross bars 34 are eliminated, and in lieu therefor there is provided a platform 60 which is countersunk in a well 61 formed in the floor of a garage, or the like.

From Figures 14, 15 and 16, it will be noted that the platform comprises an upper plate of metal, or the like, upon which the wheels 22 are adapted to rest, and that the platform is provided with a supporting frame beneath the sheet of metal, and which has longitudinal bars 62 with projecting spindles 63 at opposite ends, and about which the cables 57 are adapted to be passed, so as to support the platform on the cables.

The well 61 in the floor is provided with inwardly offset end portions 64 which lie between adjacent spindles 63 and serve as continuations of the floor for the support of the bases of the standards 50.

With this latter modified form, the vehicle is merely driven so as to dispose the wheels 22 on the platform 60, and the jack screws 52 are operated to raise the weighing device and lift the platform clear of the bottom of the well 61, so that the entire weight of the wheels 22 will be taken up by the deformable rings 29 with the result that the weight disposed on the wheels 22 may be readily ascertained.

It is, of course, understood that other means than as shown may be utilized for the raising of the rings 29, and that various modifications may be made as regards the other details of the construction above disclosed, without departing from the spirit of this invention.

In Figures 4 and 5, there is diagrammatically shown at the bottom thereof the relative location of the weight P which designates the hooks, cables, or other suspending means which may be employed, and as showing the center of gravity where it passes through the points of contact between the bead 30 of the ring 29 and the lower cross pin 31.

It is apparent from Figure 4 particularly, that the ring 29 is capable of swinging laterally at its lower end upon its point of contact with the upper pin 28, and that the lower pin 31 may also swing or rock laterally out of the plane of the ring depending upon the upright or inclined positions of the standards 24 and 50.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A vehicle weighing device comprising a deformable ring having upper and lower edge portions at its inner side, upper and lower pins bearing against said edge portions, lifting means connected to the upper pin, wheel engaging means connected to the lower pin, said pins adapted to rock on their respective edge portions of the ring to adapt the ring to angles of inclination out of the vehicle when said lifting means is operated, and indicating means arranged within the ring and connected to the diagrammatically opposed sides thereof for indicating the degree of contraction of the ring horizontally during the operation of said lifting means.

2. A vehicle weighing device including a deformable ring, lifting means connected to the top of the ring, suspension means connected to the lower portion of the ring, cross bars carried by said suspension means and adapted to engage the spaced points across the under side of the lower portion of a wheel, and indicating means connected to the deformable ring for showing the amount of horizontal contraction thereof upon operation of said lifting means.

3. A vehicle weighing device, comprising a pair of standards adapted to be placed at opposite sides of a vehicle, jack screws carried by the standards, deformable means connected at their upper portions to the lower ends of said jack screws, suspension means connected to the lower portions of said rings, cross bars carried by said suspension means and arranged to engage across the lower portions of the wheels of the vehicle whereby to raise the same upon the operation of said jack screws, and indicators connected to said deformable rings for showing the amount of distortion thereof incident to the operation of said jacks.

4. A vehicle weighing device, comprising a pair of standards adapted to be arranged at opposite sides of a vehicle, jack screws carried by the standards, deformable rings connected to the jack screws at their upper portions, pins engaging through the lower portions of the rings, hooks carried by said pins and supported thereby, transversely extending bars carried by said hooks for engagement across the lower portions of the wheels of the vehicle to raise the same upon the operation of the jack screws, and indicating means connected to said rings for showing the degree of deformation thereof when supporting said wheels.

5. A vehicle weighing device comprising a pair of standards, lifting means carried by the standards, rings connected at their upper portions to said lifting means, pins engaging through the lower portions of the rings, brackets carried upon the outer ends of said pins, rack bars carried by the brackets, cables carried by said brackets at one end and adapted to be looped downwardly and adjustably connected to said rack bars, cross bars engaging at opposite ends in said loops of the cables and adapted for engagement across the undersides of the wheels of the vehicle, and indicating means connected to said rings, and showing the degree of deformation thereof upon operation of said hoisting means.

6. A vehicle weighing device comprising standards, hoisting means carried by the standards, deformable means carried by the hoisting means, suspension devices mounted on the deformable means, and collapsible and adjustable cross bars carried by said suspension devices adapted for adjustment to engage across the under sides of wheels of a vehicle for elevating the same upon the operation of said hoisting means.

7. In a vehicle weighing device, a platform adapted to be countersunk in the floor of a garage or the like, and having outwardly extending spindles at opposite ends, portable standards arranged to extend over the ends of the platform, lifting means carried by the standards, deformable indicating members connected to the lifting means, and suspending devices carried by the deformable indicating means and adapted for engagement with said spindles to raise the same upon operation of the lifting means and elevate vehicle wheels on said platform.

ANDRÉ JULES MICHELIN.